UNITED STATES PATENT OFFICE.

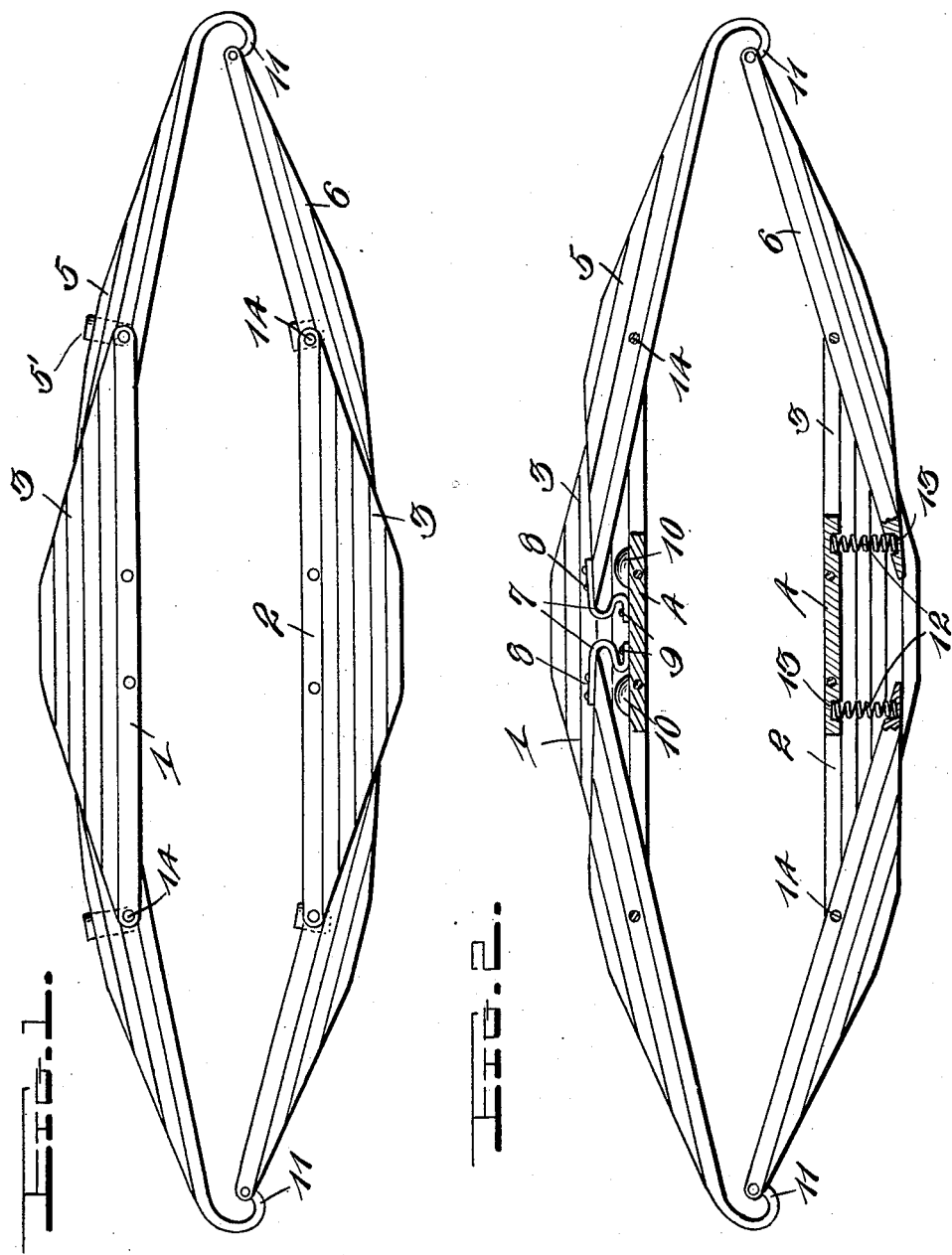

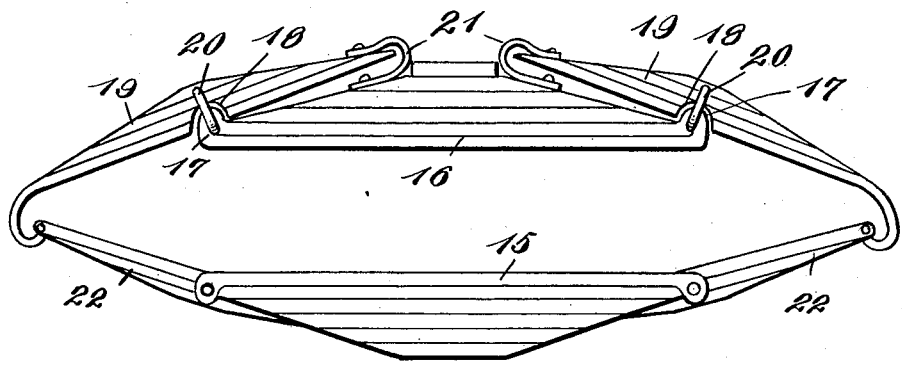
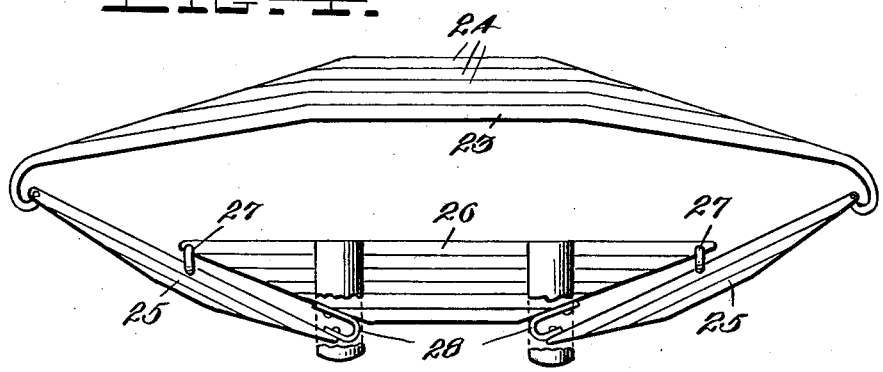
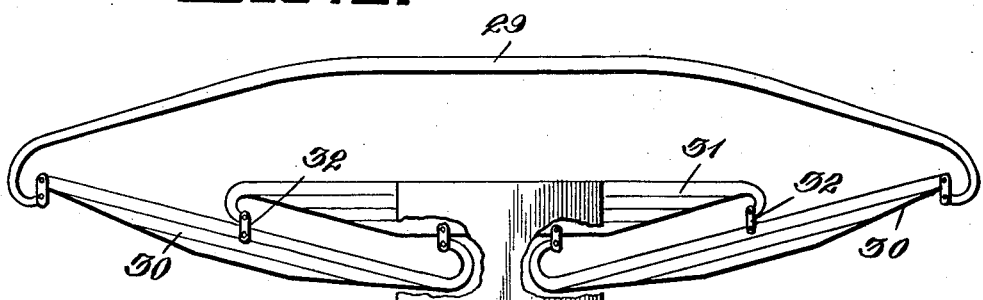

ALLISON MOFFITT, OF GALETON, PENNSYLVANIA.

VEHICLE-SPRING.

1,023,865.  Specification of Letters Patent.  Patented Apr. 23, 1912.

Application filed September 23, 1911. Serial No. 650,911.

*To all whom it may concern:*

Be it known that I, ALLISON MOFFITT, a citizen of the United States, residing at Galeton, in the county of Potter and State of Pennsylvania, have invented certain new and useful Improvements in Vehicle-Springs, of which the following is a specification, reference being had to the accompanying drawings.

This invention relates to new and useful improvements in vehicle springs and has for its object to provide a spring for vehicles, particularly such vehicles as automobiles and the like, which shall combine in itself the qualities of both vehicle spring and shock absorber.

A further object of the invention is to provide a device of this character which will possess advantages in points of efficiency, durability, is inexpensive of manufacture and at the same time is simple in construction and operation.

With the above and other objects in view the invention consists in the novel features of construction, combination and arrangement of parts hereinafter more fully described, pointed out in the claims and shown in the accompanying drawings, in which—

Figure 1 is a side elevation of a spring constructed in accordance with my invention; Fig. 2 is a longitudinal sectional view; Fig. 3 is a side elevation of a modified form of spring; Fig. 4 is a side elevation of another modified form of spring, and Fig. 5 is a side elevation of still another form of spring used on light vehicles.

Referring to the drawings the numerals 1 and 2 indicate the upper and lower central spring members, the upper member is secured to the bottom of the vehicle in any desired manner and the lower member is secured to the axle in any suitable manner. These spring members comprise two spaced members 3 arranged in parallel relation and secured to the spacing blocks 4.

Pivotally mounted between the outer ends of the body members 1 and 2 are the auxiliary spring members comprising upper and lower members 5 and 6, the upper members having the springs 7 secured thereto at their inner ends, said springs being bent into S-shape and having one end secured to the ends of the members 5 as shown at 8 and the other end is secured to the spacing block 4 by means of the rivets 9. Secured to the spacing block and disposed under the inner end of the auxiliary spring members are the rubber bumpers 10, which are adapted to be engaged by the ends of the auxiliary spring members when the spring is suddenly compressed so as to relieve the weight from the small springs 7. Oil cups 5′ are carried by the auxiliary spring members and disposed above the bearing pins 14, the oil is provided to relieve any friction between the central spring members and the auxiliary members. The outer ends of these members 5 are curved downwardly and then bent inwardly at 11 and secured to the outer ends of the lower members 6. Disposed between the inner ends of the members 6 and the spacing block in the lower central spring member 2 are the coil springs 12, said springs having each end mounted in the recesses 13 formed in the spacing block and in the ends of the members 6. These end members 5 and 6 are pivoted at their center on the pivot bolts 14 which form a fulcrum for said auxiliary members.

In operation, when the vehicle is running over a relatively smooth road the spring will permit the necessary flexibility of the vehicle body and will act much in the same way as any other spring. When, however, the vehicle strikes a sudden obstruction or a relatively deep recess, the springs 7 and 12 will permit the members 5 and 6 to compress and expand freely thus allowing the whole spring to compress and expand and with much greater freedom, and securing a much more even running of the vehicle body than by the springs in use at the present time.

In Fig. 3, I have shown a modified form of spring in which the lower central spring member 15 is constructed the same as member 2 in Fig. 1, and the upper central member 16 is formed solid and having its ends turned upwardly to form a rounded stud 17, said stud being disposed in the recess 18 formed in the auxiliary members 19, said auxiliary members being pivotally mounted upon said stud and held in place by means of the link members 20. Secured to the inner end of the members 19 are the springs 21 having one end secured to the end of the members 19 on the top thereof and the other end secured to the top of the member 16. The outer ends of the members 19 are curved downwardly and then bent inwardly and secured to the lower auxiliary members 22. This form of spring is adapted to be used if so desired in place of the one first described.

In Fig. 4 I have shown another form of spring, in which the upper part of the spring is made in one single member 23. A number of leaves 24 are provided and secured to the top side of this member to render it relatively stiff. Each end of the member 23 is curved downwardly and inwardly and then secured to the outer ends of the auxiliary members 25, these members 25 are pivotally mounted on the outer ends of the lower central spring member 26 by means of the links 27. Small leaf springs 28 are secured to the inner ends of the members 25 and then bent upon themselves and secured to the central spring members 26. This form of spring can be used in place of the forms shown in Figs. 1 and 3 when so desired and will have much the same effect on the vehicle on rough and uneven roads.

In Fig. 5 I have shown a form of spring adapted for use on light vehicles. In this form a single leaf spring is used for the upper spring member 29, said member having its ends curved downwardly and secured to the auxiliary spring members 30. The auxiliary members 30 are mounted on the ends of the central spring member 31, said central member having its ends tapered down and then curved downwardly and inwardly and secured to the central portion of the auxiliary by the link members 32. The inner ends of the members 30 are bent upon themselves and then secured to the lower side of the central member 31.

The operation of the various modified forms is practically the same as described for the form shown in Figs. 1 and 2.

It will be seen in Fig. 5 that instead of being pivoted directly on to the end of the central member 31 the end of the member 31 is curved downwardly and inwardly and the auxiliary members 30 are pivoted on the curved end forming a spring pivot which will, when the whole spring is compressed, tend to relieve the single upper member 29 of any strain or weight.

While I have shown and described the preferred forms of my invention it will be obvious that various changes in the details of construction and in the proportions may be resorted to for successfully carrying my invention into practice without sacrificing any of the novel features or departing from the scope thereof.

Having thus described the invention, I claim:

1. A vehicle spring comprising upper and lower primary spring members and auxiliary spring members pivotally connected to said upper and lower spring members and independently movable thereof, said auxiliary spring members being also yieldingly connected at one of their ends to one of the primary spring members.

2. A vehicle spring comprising upper and lower spring members, said members comprising central members and auxiliary members, each of said central members comprising two spaced parallel spring members, a spacing block disposed between said members, said auxiliary members being pivotally secured between the ends of said central members, S-shaped springs having one end secured to the inner end of the upper auxiliary members and the other end secured to the spacing block, bumpers mounted on said spacing block and disposed beneath the inner ends of the auxiliary members, and coil springs disposed between the inner ends of the lower auxiliary member and the spacing block in the lower central spring member.

3. A vehicle spring comprising primary upper and lower central spring members, and auxiliary spring members pivotally connected to the ends of each of the primary spring members, and additional means connecting said primary and auxiliary spring members whereby the auxiliary members are yieldingly movable independently of the primary members.

4. A vehicle spring comprising upper and lower primary spring members, and auxiliary spring members pivotally connected to the primary members and yieldingly movable with respect to said primary members when subjected to abnormal pressure.

5. A vehicle spring comprising upper and lower primary spring members, auxiliary spring members pivotally mounted intermediate of their ends upon the ends of the primary spring members, and spring elements connecting the inner ends of the auxiliary members to the primary members whereby said auxiliary members are yieldingly held against pivotal movement independent of the primary members.

6. A vehicle spring comprising upper and lower primary spring members, auxiliary spring members pivotally mounted intermediate of their ends upon the ends of the primary members, the outer ends of said auxiliary members upon the respective spring members being pivotally connected, and means yieldingly holding said auxiliary members at an angle with relation to the longitudinal axis of the primary members to dispose said auxiliary members for movement independently of the primary members when the latter are subjected to abnormal pressure.

In testimony whereof I hereunto affix my signature in the presence of two witnesses.

ALLISON MOFFITT.

Witnesses:
WILLIAM BERNARD,
N. B. HYDE.

Copies of this patent may be obtained for five cents each, by addressing the "Commissioner of Patents, Washington, D. C."